US011142590B2

United States Patent
Gagliardi et al.

(10) Patent No.: US 11,142,590 B2
(45) Date of Patent: Oct. 12, 2021

(54) SOLIDIFICATION OF A NATURAL RUBBER LATEX BY POLYQUATERNARY POLYMERS

(71) Applicant: VERSALIS S.P.A., San Donato Milanese (IT)

(72) Inventors: Giacomo Gagliardi, Massa Lombarda (IT); Giovanni Regattieri, Rodigo (IT); Emanuele Mazzotti, S. Alberto (IT)

(73) Assignee: VERSALIS S.P.A., San Donato Milanese (IT)

( * ) Notice: Subject to any disclaimer, the term of this patent is extended or adjusted under 35 U.S.C. 154(b) by 160 days.

(21) Appl. No.: 16/325,012

(22) PCT Filed: Aug. 11, 2017

(86) PCT No.: PCT/IB2017/054908
§ 371 (c)(1),
(2) Date: Feb. 12, 2019

(87) PCT Pub. No.: WO2018/033840
PCT Pub. Date: Feb. 22, 2018

(65) Prior Publication Data
US 2019/0177442 A1 Jun. 13, 2019

(30) Foreign Application Priority Data

Aug. 19, 2016 (IT) .................. 102016000086155

(51) Int. Cl.
*C08C 1/15* (2006.01)
*C08L 7/02* (2006.01)
*C08C 1/02* (2006.01)
*C08C 1/07* (2006.01)
*C08C 2/06* (2006.01)
*C08C 1/12* (2006.01)

(52) U.S. Cl.
CPC ............ *C08C 1/15* (2013.01); *C08C 1/02* (2013.01); *C08C 1/07* (2013.01); *C08C 1/12* (2013.01); *C08C 2/06* (2013.01); *C08L 7/02* (2013.01)

(58) Field of Classification Search
CPC .... C08C 1/15; C08C 1/02; C08C 3/02; C08C 1/07; C08L 7/02
See application file for complete search history.

(56) References Cited

U.S. PATENT DOCUMENTS

| 4,569,991 A | 2/1986 | Fujino |
| 4,581,444 A | 4/1986 | Fujino |
| 2015/0291765 A1 | 10/2015 | Sasaki et al. |

FOREIGN PATENT DOCUMENTS

| CN | 1756773 A | 4/2006 |
| EP | 0 084 837 A1 | 8/1983 |
| EP | 2 268 675 B1 | 11/2013 |
| EP | 2 896 633 A1 | 7/2015 |

OTHER PUBLICATIONS

Combined Chinese Office Action and Search Report dated Jun. 28, 2020 in corresponding Chinese Patent Application No. 201780049879.0 (with English Translation) citing documents AO therein, 18 pages.
International Search Report dated Nov. 10, 2017 in PCT/IB2017/054908 filed on Aug. 11, 2017.
Office Action dated May 31, 2021, in corresponding Korean Patent Application No. 10-2019-7005277 (with English translation).

*Primary Examiner* — Peter D. Mulcahy
(74) *Attorney, Agent, or Firm* — Oblon, McClelland, Maier & Neustadt, L.L.P.

(57) ABSTRACT

The present invention relates to a solidification process of the natural rubber latex by means of polyquaternary polymers. The process of the present invention has the advantage to not require the addition of acids and/or salts, with an evident saving in terms of cost for the reagents. Furthermore, in such a way neither the neutralization step of the rubber nor the treatment of the processing water before their disposal are required. The process of the present invention is suitable both for the continuous and batchwise embodiment, with evident advantages as far as its industrial application is concerned.

16 Claims, No Drawings

SOLIDIFICATION OF A NATURAL RUBBER LATEX BY POLYQUATERNARY POLYMERS

The present invention relates to the industrial sector of extraction and manufacturing of natural rubber of plant origin.

In particular, the present invention relates to a solidification process of natural rubber latex.

Even more in particular, the present invention relates to a solidification process of the natural rubber latex, through the use of polyquaternary polymers.

Said process is characterized in that no pH adjustment of the natural rubber latex to be solidified is required.

The natural rubber, mainly constituted by cis-1,4 polyisoprene elastomer, is widely used for a variety of several commercial uses. The properties of the natural rubber make the latter particularly indicated for the application in the tire industry and for the production of manufactured goods and articles in the sector of childhood and sport articles and disposable products for biomedical use.

The main sources of natural rubber are represented by the latex from several plant species.

The most important species belongs to the genus *Hevea* such as, for example, *Hevea brasiliensis*, which is cultivated in the tropical and subtropical regions of South-East Asia and in the South American continent. The natural rubber of *Hevea brasiliensis* can be simply obtained by collecting the latex which is present in the lactiferous ducts along the rind, carrying out cortex incisions to said canals. Generally, about 80% of latex, to which ammonia is added as antibacterial, is collected within 3-4 hours from the slit.

The latex extracted from these plants is characterized by the presence of protein contaminants which are present also in the natural rubber manufactured goods obtained from such source, and which represent a cause of possible allergic reactions of type I (or IgE-mediated), which also can be very serious for users of the above-mentioned manufactured goods.

Furthermore, it was demonstrated that the presence of proteins can adversely affect the dynamic properties of the natural rubber.

For this reason, one or more steps, which have the aim to reduce the protein content present in the latex, can be involved in some methods of extraction and/or processing of the natural rubber.

Alternatively, more recently methods and technologies of extraction of natural rubber from non-*Hevea* plants were developed, such as, for example, plants of guayule or the guayule-type: in fact, the rubber which can be extracted is substantially protein-free and particularly it's free of allergizing substances and therefore, it can be used also for the production of manufactured goods for biomedical use intended for subject sensitive to the contact with *Hevea* rubber.

Guayule (*Partenium argentatum*) is a perennial shrub hailing from the semi desert regions of the South-West U.S.A. (particularly of Texas) and of North Mexico.

The natural rubber of guayule, unlike that of *Hevea*, accumulates within the cells of the plant and can be obtained by crushing the plant material and collecting the cell components through physical and/or chemical methods.

In order to process the natural rubber of *Hevea* or guayule, it can be necessary to solidify the latex extracted from these plants, through a process of coagulation of the above-mentioned latex in rubber particles.

Several methods and processes aimed to obtain the coagulation of the natural rubber latex are disclosed in the known art.

Traditionally, the methods of coagulation of the natural rubber involve the addition of destabilizers such as, for example, inorganic or organic acids (for example, formic acid, citric acid, phosphoric acid, sulfuric acid), bi- or tri-valent metal salts (for example, calcium and aluminum chlorides and nitrates), organic salts (for example, cyclohexylamine acetate) to the latex, as such or diluted with water.

More recently methods of coagulation which do not use the above-mentioned reagents were found.

For example, the patent application CN 102477109 (A) provides the solidification of the rubber by applying a negative pressure ranging from 0 to −0.095 MPa for about 15 minutes to a latex suspension, to which a small amount of acetic acid was added.

The European patent application EP 2 671 913 A1 discloses a method which provides the spontaneous obtainment of the natural rubber coagulum, by simple aging of the latex for at least three days in the presence of a preservative.

As already mentioned, in order to improve the dynamic properties of the natural rubber and avoid the allergenic effects of the *Hevea* rubber in sensitive subjects, it could be advantageous to produce such raw material with a low content of proteins.

For example, the application GB 2098222A discloses a process comprising the anaerobic fermentation of the *Hevea* latex stabilized with non-ionic surfactants, the treatment with at least one proteolytic enzyme and then, after possible dilution with water, the coagulation of the latex by acid addition.

Such microbial and enzymatic treatment leads to the obtainment of a natural rubber with a particularly reduced content of nitrogenous compounds (among which proteins) and ashes.

Also CN102002119 (A) discloses a method of coagulation which uses proteolytic enzymes, for example papain, at a concentration ranging from 0.05 to 1% by weight.

However, such treatments involve longer manufacturing times and above all the use of refined reagents, such as enzymes, causes the increase of the production costs.

Alternatively, it can be advantageous to prepare the natural rubber from sources which originally do not contain the above mentioned protein contaminants, such as for example, latex extracted from guayule plants and of the guayule-type.

The natural rubber obtained from the guayule plant, as well as from other plants belonging to the genus of *Asteraceae, Euphorbiaceae, Campanulaceae, Labiatae* and *Moraceae* such as, for example, *Euphorbia lathyris, Parthenium incanum, Chrysothamnus nauseosus, Pedilanthus macrocarpus, Cryptostegia grandiflora, Asclepias syriaca, Asclepias speciosa, Asclepias subulata, Solidago altissima, Solidago gramnifolia, Solidago rigida, Sonchus arvensis, Silphium* spp., *Cacalia atriplicifolia, Taraxacum koksaghyz, Pycnanthemum incanum, Teucreum canadense, Campanula americana* (for the sake of brevity indicated with the term "of the guayule-type"), is an important alternative to the natural rubber of *Hevea brasiliensis*, also in view of the higher resistance of these species to the pathogen agents which attack the *Hevea* and the lower importation costs of this raw material of plant origin.

In this respect, the U.S. Pat. No. 9,273,153 discloses a method of treatment of a latex which comprises contacting guayule latex with at least one coagulant in a treatment zone, set and arranged to promote the guayule latex coagulation, washing the coagulum with water and subsequent extrusion. The method of U.S. Pat. No. 9,273,153 further comprises a removing step of the resin present in the coagulated rubber of guayule with organic solvents.

According to one embodiment, the process disclosed in U.S. Pat. No. 9,273,153 is carried out by pouring the latex through the nozzles in a canal wherein a water-based coagulation fluids is let to flow ("flume process"), so as the coagulum is transported by the going fluid towards the following treatment steps as it is formed, thus avoiding the formation of macrocoagulums characterized by a hard workability.

In U.S. Pat. No. 9,273,153 formic acid, citric acid, acetic acid, sulfuric acid or a mixtures of said acids are indicated among the coagulants. Furthermore, a salt of a metal such as, for example, calcium, barium, magnesium, strontium, used alone or in mixture with an acid, can be used as coagulant.

However, the known solutions already have room for improvement.

In fact, the coagulation processes with diluted acids, such as for example, formic acid or acetic acid, generally tend to coagulate the latex in an incomplete way.

On the other hand, the use of concentrated acids can determine degradative events of the natural rubber. Furthermore, the use of corrosive acids also makes necessary the treatment of waste water.

Another drawback of the coagulation methods which use salts and/or acids, is due to the facts that the coagula of natural rubber are particularly sticky, thus making the suspension containing them particularly unstable and of hard workability: in fact the rubber coagula show a tendency to form macrocoagula, which can even block the stirring and extrusion mechanical devices.

Therefore, it is an aim of the present invention to provide a process for the solidification of a natural rubber latex which is substantially free of drawbacks of the known art highlighted herein.

In fact, the Applicant has found an innovative process to obtain rubber in the solid form using a polyquaternary polymer as destabilizer of the emulsion represented by the rubber latex.

Through the process of the present invention it is possible to obtain high-quality solid rubber particles, homogeneous as for the size and that don't show the tendency to aggregate from each other forming sticky macrocoagula.

The process of the present invention has the advantage to not require the addition of acids and/or salts, with an evident saving in terms of costs for the reagents. Furthermore, in such a way neither the neutralization step of the solidified rubber nor the treatment of the processing water before their disposal is required.

Particularly, said process is characterized by the fact that the adjustment of the pH of the natural rubber latex, before it is contacted with the above-mentioned polyquaternary polymer, is not required.

Instead, in several process described in the prior art, the pH adjustment is considered to be essential to cause the coagulation of the natural rubber latex: for example, in GB 2 098 222 A the pH of the rubber latex is brought to a value of about 5 by adding an organic or inorganic acid, such as for example, formic acid or sulfuric acid.

It is important to note also that the pH adjustment can be considered essential also to cause the coagulation of the synthetic rubber latex, as occurs in the process disclosed in U.S. Pat. No. 4,001,486 A, wherein said pH is brought to values ranging from 1.5 to 7.0 by adding acids.

Finally, the process of the present invention is suitable both for the continuous and batchwise embodiment, with evident advantages as far as its industrial application is concerned.

Further features and advantages of the present invention will be evident from the following detailed description.

For the aims of the present description and of the following claims, the definitions of the numerical ranges always comprises the end-points, unless otherwise specified.

In the description of the embodiments of the present invention, the use of the terms "comprising" and "containing" means that the options described, for example relating to the steps of a method or a process or the components of a product or a device, are not necessarily exhaustive. However, it is important to note that an object of the present invention are also the embodiments wherein the term "comprising" referred to the options described, for example such options relating to the steps of a method or a process or the components of a product or a device, is to be interpreted as "consisting essentially of" or "consisting of", even if not explicitly declared.

For the aims of the present description and of the following claims, the percentages always are percentage by weight, unless otherwise specified.

For the aims of the present invention, the term "guayule-type" plants means plant species which are not attributable to the tree of the *Hevea brasiliensis* and comparable to the shrub of the species *Parthenium argentatum* (guayule plant). In fact, such grouping of convenience comprises the plant species belonging to the genera of *Asteraceae, Euphorbiaceae, Campanulaceae, Labiatae* and *Moraceae* such as, for example, *Euphorbia lathyris, Parthenium incanum, Chrysothamnus nauseosus, Pedilanthus macrocarpus, Cryptostegia grandiflora, Asclepias syriaca, Asclepias speciosa, Asclepias subulata, Solidago altissima, Solidago gramnifolia, Solidago rigida, Sonchus arvensis, Silphium* spp., *Cacalia atriplicifolia, Taraxacum kok-saghyz, Pycnanthemum incanum, Teucreum canadense, Campanula americana* (for the sake of brevity indicated with the term "of guayule-type") characterized by the fact to contain the rubber latex within the parenchymal cells rather than in systems of lactiferous canals, typical of *Hevea*.

In some cases, the natural rubber latex is stabilized by adding an alkaline compound after the collection, for example ammonia, as described for example in EP 2 671 913 A1, and its pH has therefore a value higher than or equal to 7.0 and preferably ranging from about 7.0 to 13.0.

For the aims of the present invention, the term "coagulation" means the process of solidification of the natural rubber latex by coalescence, aggregation and/or flocculation of the natural rubber particles originally dispersed in the emulsion which constitutes the latex, in order to form the so-called "coagulum", characterized by a solid structure more or less compact, which can precipitate or remain in suspension in the liquid fraction defined "latex serum". For the aims of the present description, the terms "coagulation" and "solidification" can be indifferently used, as they have the same meaning.

For the aims of the present invention, "phr" ("part per hundred rubber" o "part per hundred resin") means the percentage by weight of a component of a mixture comprising one or more elastomers with respect to the total weight of said one or more elastomers.

For the aims of the present invention, the term "particle size" means the size of at least 95% with respect to the total number of the particles of solid natural rubber; such size is represented by the particle diameter when said particle is substantially spherical or, in the case of particles having an extended shape, it is represented by the higher size of said particles. The particle size distribution of the particle can be determined, for example, by granulometric techniques, sieving, settling, etcetera, according to methods known to one skilled in the art.

In a first aspect, the present invention relates to a process for the solidification of a natural rubber latex comprising the steps of:

a) contacting the natural rubber latex with a polyquaternary polymer, obtaining a suspension of solid natural rubber particles in a liquid phase comprising a latex serum;

b) separating the solid natural rubber particles from the liquid phase of the suspension obtained in the previous step.

The process as above described is perfectly scalable.

In a preferred aspect, said process is carried out batchwise ("batch").

Preferably, when the process is carried out batchwise, the step a) can comprise a first step wherein substantially all the natural rubber latex to be processed is fed to a mixing area and a second step wherein the polyquaternary polymer is fed to said mixing area.

In the case above described, said polyquaternary polymer can be fed to said mixing area under stirring in a time ranging from 0.5 to 60 minutes and preferably it can be fed in a time ranging from 1 to 5 minutes.

Optionally, after having contacted the natural rubber latex with the polyquaternary polymer, the suspension of solid natural rubber particles thus obtained can be maintained under stirring for a time ranging from 0.5 to 120 minutes before passing to step b).

The "gradual" addition of the polyquaternary polymer to the natural rubber latex, and the possible optional maintenance under stirring of the obtained suspension, allows to optimally disperse said polyquaternary polymer in the latex and particularly promotes the formation of natural rubber particles which are homogeneous in terms of size.

According to another preferred aspect, the above said process is carried out in continuous.

Preferably, when the process is carried out in continuous, the step a) can be carried out by co-feeding both the natural rubber latex and the polyquaternary polymer to a mixing area.

Both in the case in which the process is carried out in continuous, and in the case in which the process is carried out batchwise, by contacting the natural rubber latex with the polyquaternary polymer, the coagulation of the latex is caused and consequently the natural rubber solidifies in the form of particles which are homogeneous in term of size, said particles not showing the tendency to aggregate from each other forming sticky macrocoagula. Furthermore, particles of solid natural rubber, whose sizes can vary in relation to the relative amount of polyquaternary polymer with respect to the latex amount (namely with respect to the phr value relating to the above-mentioned polyquaternary polymer) and the stirring speed of the obtained suspension, are produced in the same step a) of the present process.

It is important to note that, as previously remembered, the process of the present invention does not requires the pH adjustment of the natural rubber latex (for example, by adding acids) before that this one is contacted with the polyquaternary polymer, in order to obtain the quantitative solidification of the rubber present in the above-mentioned latex.

Particularly, the natural rubber latex can preferably have a pH value higher than 7.0, more preferably a pH value higher than 7.1 and even more preferably a pH value higher than 7.2.

In a particularly preferred aspect of the invention, the natural rubber latex can have a pH ranging from 7.2 to 13.

Preferably, the pH of the natural rubber latex is not significantly modified, and it is maintained in the range defined above, even after that the above-mentioned latex has been contacted with the polyquaternary polymer.

In a preferred aspect of the invention, the natural rubber latex can be obtained from *Hevea brasiliensis* plants.

According to another preferred aspect of the invention, the natural rubber latex can be obtained from plants of the guayule-type and more preferably said latex is obtained from guayule plants (*Parthenium* argentatum).

Preferably the natural rubber latex can contain at least one stabilizer, for example, an emulsifier, and/or at least one preservative, such as, for example, an antimicrobial or anti-oxidant agent.

For the aims of the present invention, the term "polyquaternary polymer" means an organic polymer characterized by quaternary ammonium functions, representable by the following theoretical formula:

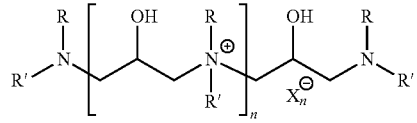

wherein R and R', equal or different from each other, are a $C_1$-$C_4$ alkyl, X is an halogen and preferably X is chlorine and n is an integer ranging from 1 to 10.000.

Said polyquaternary polymer can be obtained, for example, through the reaction of a dialkylamine, preferably water-soluble, such as for example, dimethylamine, diethylamine, dipropylamine, dibutylamine, with an epihalohydrin, preferably epichlorohydrin, or a bifunctional epoxy-compound, as described in U.S. Pat. No. 3,738,945. When the polyquaternary polymer is obtained by reacting a dialkylamine with epichlohydrin, it can be also generally referred to as "alkylamine-epichlorohydrin copolymer".

Numerous formulations of the above-mentioned polyquaternary polymer are commercially available: these formulations comprise aqueous solutions of at least one polyquaternary polymer as defined above, with a different concentration, characterized by physical-chemical parameters, such as, for example, dispersibility and viscosity, which are variable in connection with several applications.

Said formulations are used in several fields of technology: for example, they are used in the water treatment processes and in paper industry.

In a particularly preferred aspect, the used polyquaternary polymer is the dimethylamine-epichlorohydrin copolymer (CAS number 25988-97-0).

In a particularly preferred aspect of the invention, the natural rubber latex is obtained from guayule plants and the polyquaternary polymer used is the dimethylamine-epichlorohydrin copolymer.

Preferably, said polyquaternary polymer is used in step a) of the process in the form of an aqueous solution. Preferably, said aqueous solution can have concentrations of said polyquaternary polymer ranging from 0.05% to 10% by weight with respect to the total weight of the aqueous solution, and more preferably from 0.1% to 5% by weight with respect to the total weight of the aqueous solution.

In a preferred aspect, said aqueous solution of said polyquaternary polymer, is used in step a) in a volume per weight unit of latex ranging from 0.5 ml/g of latex to 5 ml/g of latex and preferably ranging from 1 ml/g of latex to 4 ml/g of latex.

The total amount of said polyquaternary polymer used in step a) can be ranging from 0.25 phr to 5 phr and more preferably from 0.5 phr to 3 phr.

Preferably, the step a) of the process is carried out under constant stirring, in order to promote the contact between the polyquaternary polymer and the natural rubber latex. The stirring can be maintained by mechanical or magnetic stirrers, static, orbital or rotating mixer. The stirring can be carried out by gas bubbling, for example air, or by recirculation.

Preferably, the step a) of the process is carried out at a temperature ranging from 0.5° C. to 50° C. and more preferably it is carried out at a temperature ranging from 10° C. to 30° C.

In the suspension of solid natural rubber particles in latex serum obtained at the end of step a) of the process according to the invention, the weight ratio percentage between the solid natural rubber particles and the latex serum can be comprised in the range of from 5-30% by weight with respect to the weight of the total suspension and preferably it is comprised within the range of from 10-25% by weight.

The latex solidification carried out through the process of the present invention is highly efficient and preferably it is higher than 98%.

The latex solidification efficiency is determined in the following manner: a known latex amount (expressed by weight) is brought to dryness into an oven at 160° C. up to achieve a constant weight. The percentage of solid in the latex (% $S_L$, w/w) is calculated from the weight of the obtained residue. Preferably, the percentage of solid in the latex can be ranging from 30 to 70% and more preferably it is ranging from 40% to 60%.

The total mass of rubber to be solidified (X g) is calculated from the total amount of latex to be processed (expressed by weight) and from the percentage of solid % $S_L$. At the end of the solidification process, the suspension is subjected to separation of the coagulated particles of natural rubber from the latex serum, with a sieve having a net of 325 meshes. A known amount (by weight) of the above mentioned latex serum (comprising non-coagulated latex and possibly the fine rubber particles which are not held by the sieve), obtained after the separation of rubber particles, is brought to dryness into an oven at 160° C. up to achieve a constant weight. The percentage of solid in the latex serum (% $S_s$, w/w) is calculated from the weight of the residue obtained. The total mass of non-coagulated rubber, or coagulated in fine particles (Y g), is calculated from the total amount of latex serum obtained at the end of the process (possibly comprising the fine rubber particles which are not held by the sieve) and from the solid percentage % $S_s$. The solidification efficiency is calculated through the expression:

Efficiency %=(1−Y/X)·100

In step b) of the process according to the invention, the solid natural rubber particles in suspension obtained in step a) are separated from the liquid phase of said suspension.

The above-mentioned liquid phase can comprise water, latex serum, non-coagulated natural rubber and possibly stabilizers and/or preservatives.

In order to separate the above-mentioned solid natural rubber particles in suspension, any method for separating a solid from a liquid, which is known to one skilled in the art, can be used.

Preferably, the separation step b) is carried out in a separation zone in which the suspension obtained in step a) is processed to separate solid natural rubber particles from the liquid phase.

Said separation step b) can be carry out preferably by filtration of the above-mentioned suspension. In this case it is possible to use, for example, metal sieves, membrane filters, press filters, vacuum filters, rotary presses, screw presses, etcetera.

In another preferred aspect, said separation in the step b) can be carried out by centrifugation, continuous or batch-wise, of the above mentioned suspension.

As the solid natural rubber particles tend to clump in the higher portion of the liquid phase where they are immersed, according to a particular preferred aspect, the separation of the solid natural rubber particles from the liquid phase of the suspension in step b) can be carried out by decantation or siphoning.

In order to separate the solid natural rubber particles from the liquid phase it is possible to take advantage of the flotation properties of the same particles. In this case, as the suspension of solid natural rubber particles is obtained in a liquid phase comprising a latex serum in the step a), it can accumulate, or be transferred, in a container, for example, a infinity tank, so that, when the volume of the suspension obtained exceeds the volume of said tank, the solid rubber particles, overflowing through an overflow structure, can come out from the container and being directed in a separation zone placed downstream of the same overflow structure itself.

Preferably, the above mentioned separation zone can comprise a sieve, by which said particles are held and collected. The liquid phase, which is not held by the sieve, can be directed to the disposal.

Preferably, said sieve has a net with meshes having sizes ranging from 44 microns to 45 mm. In a further preferred aspect, said sieve has a net with meshes of sizes ranging from 0.5 mm to 10 mm.

In a preferred aspect of the invention, the solidification process of the natural rubber latex can comprise one optional washing step of the solid natural rubber particles with water. Said optional washing step can be placed between step a) and step b) of said process, or downstream of said step b).

When the washing step is placed between step a) and step b) of the process, it can be carried out by dilution with water of the suspension of solid natural rubber particles in latex serum.

When the washing step is placed downstream of step b), it can be carried out contacting the above-mentioned particles of solid natural rubber with water after having separated them from the liquid phase of the suspension.

In a preferred aspect of the invention, the solidification process of the natural rubber latex can comprise both a washing step placed between the step a) and step b) of the process, and a washing step placed downstream of step b).

The aim of the optional washing step is to remove or throw out by dilution the possible components present in the liquid phase, for example the latex serum, the non-coagulated natural rubber and possibly stabilizers and/or preservatives, from the solidified natural rubber, thus improving the qualitative properties.

In a preferred aspect, the optional washing step is carried out at a temperature ranging from 0.5° C. to 50° C. and preferably it is carried out at a temperature ranging from 10° C. to 30° C.

In the optional washing step any water volume can be used, in relation to the volume of the suspension of solid natural rubber particles in latex serum or the volume of the same particles.

According to one embodiment, when the optional washing step is placed between the step a) and the step b) of the process according to the invention, said washing can be carried out in a tank containing the suspension of solid rubber particles in latex serum, wherein, in continuous or batchwise, a volume of water is fed and a volume of water, preferably equal to the fed volume, of solid rubber particles and/or liquid phase of the suspension, comprising water, latex serum, non-coagulated natural rubber and possibly stabilizers and/or preservatives, is removed.

According to a second embodiment, when the optional washing step is placed between step a) and step b) of the process, said washing can be carried out in a tank containing water wherein, in continuous or batchwise, the suspension of solid natural rubber particles in latex serum obtained in step a) is fed, and a volume, preferably a volume equal to the volume fed, of solid natural rubber particles and/or liquid phase of the suspension comprising water, latex serum, non-coagulated natural rubber and possibly stabilizers and/or preservatives, is removed.

In both the embodiments of the invention, in the case where the optional washing step is placed between step a) and step b) of the process, the ratio between the volume of the suspension of solid natural rubber particles and the volume of water in the tank is preferably maintained in a range of from 0.01 to 0.20 and more preferably of from 0.02 to 0.15.

According to an alternative embodiment, when the optional washing step is placed downstream of step b) of the process, said washing can be carried out in a thank in which the solid rubber particles are collected, after the separation of the liquid phase of the suspension, wherein, in continuos or batchwise, a volume of water is fed and a volume, preferably equal to the volume fed, of solid natural rubber particles and/or liquid phase of the suspension, comprising water, latex serum, non-coagulated natural rubber and possible stabilizers and/or preservatives, is removed.

In a further embodiment of the invention, when the optional washing step is placed downstream of step b) of the process, said washing can be carried out in a tank containing water wherein, in continuous or batchwise, a volume of solid natural rubber particles is fed and a volume, preferably a volume equal to the volume fed, of particles of solid natural rubber and/or liquid phase of the suspension, comprising water, latex serum, non-coagulated natural rubber and possibly stabilizers and/or preservatives, is removed.

In the embodiments of the invention, in the case where the above-mentioned optional washing step is placed downstream of step b) of the process, the ratio between the volume of the solid natural rubber particles and the volume of water in the tank is preferably maintained in a range of from 0.01 to 2, and more preferably of from 0.1 to 1.

As mentioned above, through the process of the present invention it is possible to obtain solid natural rubber in the form of particles which are homogeneous in terms of sizes and which do not show the tendency to aggregate to form the sticky macrocoagula typically obtained through the process of the known art. For this reason, the process of the present invention can be carried out without using particular apparatus or apparatus which are exclusively dedicated to the process itself.

In fact, the above-mentioned particles are simply movable fluidodinamically in aqueous suspension, do not impede the correct functioning of the stirrers and in general have better properties as for the following processing (for example, sieving, drying, extrusion).

Therefore, it is a second object of the present invention the particles of solid natural rubber obtainable by the process of the invention.

In a preferred aspect, said solid natural rubber particles are of guayule rubber or of guayule-type plants.

The solid natural rubber particles obtained by the process of the present invention were analyzed through the methods known to one skilled in the art. For example, a possible reference for such methods is the standard ASTM D2227-96 (reapproved in 2015).

The above-mentioned natural rubber particles can have sizes ranging from 45 µm to 50 mm. More preferably, the above-mentioned particles can have sizes ranging from 100 µm to 20 mm. In a particularly preferred aspect, the above-mentioned solid natural rubber particles have sizes ranging from 0.5 mm to 10 mm.

The particle size can be determined by granulometry, by sieving, sedimentation, etcetera, according to the methods known to one skilled in the art.

The above-mentioned particles are characterized by a residual moisture ranging from 50% to 90% by weight, preferably from 60% to 85% by weight and even more preferably from 65% to 80% by weight.

The residual moisture was determined by measuring the weight variation of a sample of solid rubber particles in a gravimetric oven set to the temperature of 160° C. at room pressure, up to obtain a constant weight.

The molecular weight (MW) distribution of the polymer constituent of the solid natural rubber of the particles obtainable through the process according to the invention, determined by the gel permeation chromatography (GPC) analysis, suitably carried out in accordance with the standards method ISO 11344:2004, IDT ("Rubber, raw, synthetic—Determination of the molecular-mass distribution of solution polymers by gel permeation chromatography"), by using polystyrene as standard and by applying the method of the universal calibration. The weight average molecular mass of the above said natural rubber in the solid rubber particles is ranging from $5 \cdot 10^5$ to $1 \cdot 10^7$ g/mol and preferably it is ranging from $7 \cdot 10^5$ g/mol to $5 \cdot 10^6$ g/mol.

The Mooney viscosity index ($ML_{1+4}$) was determined on a sample of solid natural rubber particles obtained by the process of the invention, according to the standard method ASTM D1646-07, and it was ranging from 50 to 80, and preferably ranging from 55 to 75.

Based on the tests carried out, the natural rubber in the solid rubber particles obtained by the process of the present invention reaches, or can exceed, the minimum requirements provided by the international standards, for example by the ASTM D2227-96 standard (reapproved in 2015).

In order to put into practice and better illustrate the present invention, some non-limiting examples are reported below.

EXAMPLE 1 (SOLIDIFICATION TEST OF A NATURAL RUBBER LATEX OF GUAYULE WITH A POLYQUATERNARY POLYMER)

Into a container of 500 mL containing 50 g of natural rubber latex of guayule with 52% of solid and having a pH value of about 12, 190 mL of a solution consisting of 0.25 g of dimethylamine-epichlorohydrin copolymer (commercially available under the commercial name Prodefloc® or Floquat® FL 2250) in 190 ml of water were added.

The obtained mixture was maintained at the temperature of 25° C. for about 1 minute, by mixing with a magnetic stirrer set at 200 rpm.

In this conditions, the latex coagulation and the formation of a suspension of solid natural rubber particles in latex serum was observed.

Particles were separated without any difficulty from the suspension obtained by filtration with a filter of 325 meshes (44 μm) net.

The characterization of the obtained solid natural rubber particles provided results which were in line with the international standards (for example, ASTM D2227-96—reapproved in 2015), confirming the effectiveness of the process in order to obtain the natural rubber having excellent mechanical properties and workability.

EXAMPLE 2 (SOLIDIFICATION TEST OF A NATURAL RUBBER LATEX OF GUAYULE WITH A POLYQUATERNARY POLYMER)

Into a container of 500 mL containing 90 g of natural rubber latex of guayule with 41% of solid and having a pH value of about 12, 200 mL of a solution consisting of 0.5 g of dimethylamine-epichlorohydrin copolymer (commercially available under the commercial name Prodefloc® or Floquat® FL 2250) in 200 ml of water were added.

The obtained mixture was maintained at the temperature of 25° C. for about 1 minute, by mixing with a magnetic stirrer set at 200 rpm.

In this conditions, the latex coagulation and the formation of a suspension of solid natural rubber particles was observed. The suspension of solid natural rubber particles in latex serum was then poured in a 10 L container, containing 8 L of water.

The aqueous suspension thus obtained was maintained under stirring for about 2 minutes, then particles were separated from the suspension by filtration with a filter of 325 meshes (44 μm) net.

The characterization of the obtained solid natural rubber particles provided results which were in line with the international standards (for example, ASTM D2227-96—reapproved in 2015), confirming the effectiveness of the process in order to obtain the natural rubber having excellent mechanical properties and workability.

EXAMPLE 3 (SOLIDIFICATION TEST OF A NATURAL RUBBER LATEX OF *HEVEA BRASILIENSIS* WITH A POLYQUATERNARY POLYMER)

Into a container of 500 mL containing 45 g of natural rubber latex of *Hevea brasiliensis* with 60% of solid and having a pH value of about 9.5, 100 mL of a solution consisting of 0.17 g of dimethylamine-epichlorohydrin copolymer (commercially available under the commercial name Prodefloc® or Floquat® FL 2250) in 100 ml of water were added.

The obtained mixture was maintained at the temperature of 25° C. for about 1 minute, by mixing with a magnetic stirrer set at 200 rpm.

In this conditions, the latex coagulation and the formation of a suspension of solid natural rubber particles in latex serum was observed. The suspension of solid natural rubber particles in latex serum was then poured in a 10 L container containing 4 L of water.

The aqueous suspension thus obtained was maintained under stirring for about 2 minutes, then particles were separated from the suspension by filtration with a filter of 325 meshes (44 μm) net.

The characterization of the obtained solid natural rubber particles provided results which were in line with the International Standards (for example, ASTM D2227-96—reapproved in 2015), confirming the effectiveness of the process in order to obtain the natural rubber having excellent mechanical properties and workability.

EXAMPLE 4 (SOLIDIFICATION TEST IN CONTINUOUS OF A NATURAL RUBBER LATEX OF GUAYULE WITH A POLYQUATERNARY POLYMER)

A natural rubber latex of guayule with 46% of solid and having a pH value of about 12 and a 0.25% w/v solution of dimethylamine-epichlorohydrin copolymer (commercially available under the commercial name Prodefloc® or Floquat® FL 2250) in water were fed, through two peristaltic pumps at rates of 170 mL/min and 180 mL/min respectively, in a screw 20 cm long and having a diameter of 4 cm, arranged along an inclined position with a slope of 30° and maintained in rotation at the rate of 10 rotations per minute. The suspension of solid natural rubber obtained was transferred in continuous from the screw in a vessel containing 5 L of water at the temperature of 25° C. and maintained under slow stirring by mechanical stirrer. The natural rubber solidified in the form of particles which are well separated and the formation of sticky macrocoagula is not observed. Through flotation, the above-mentioned solid natural rubber particles accumulated in the higher portion of the vessel which was full of water and they overflew through an overflow structure, being then held by a sieve with a net of 325 meshes arranged in correspondence of the overflow structure itself. The determination of the amount of residual rubber in the coagulation serum, collected at the screw outlet, provided values close to zero, thus confirming that the process of coagulation is substantially a quantitative process. The characterization of the natural rubber of the obtained solid particles provided results which are in line with the International standards (for example, ASTM D2227-96—reapproved in 2015) and confirmed the effectiveness of the process carried out in continuous in order to obtain natural rubber having excellent mechanical and workability properties.

COMPARATIVE EXAMPLE 5 (SOLIDIFICATION TEST OF A NATURAL RUBBER LATEX OF GUAYULE WITH SULPHURIC ACID 20% BY WEIGHT)

3 mL of sulfuric acid 20% by weight are added into a container of 500 mL containing 50 g of natural rubber latex of guayule with 40% of solid and having a pH value of about 12.

The obtained mixture was maintained at the temperature of 25° C. for about 1 minute, by mixing with a magnetic stirrer set at 200 rpm.

In this conditions, the latex coagulation is observed. However, the solid natural rubber aggregates in a sticky macrocoagulum, which incorporates a quote of the latex serum and it is hardly separable from the latter.

Such macrocoagulum, in view of the particular sticking showed, was able to block the stirring system, with the consequence to make particularly difficult the subsequent processing.

COMPARATIVE EXAMPLE 6
(SOLIDIFICATION TEST OF A NATURAL RUBBER LATEX OF GUAYULE WITH $CACL_2$)

30 g of $CaCl_2.2H_2O$ are added into a container of 500 mL containing 50 g of natural rubber latex of guayule with 40% of solid and having a pH value of about 12.

The obtained mixture was maintained at the temperature of 25° C. for about 1 minute, by mixing with a magnetic stirrer set at 200 rpm.

The latex coagulation is observed that, however, also in this case goes up to the formation of a sticky macrocoagulum. Also in this case, the macrocoagulum, in view of the particular sticking showed, was able to block the stirring system, with the consequence to make particularly difficult the subsequent processing.

COMPARATIVE EXAMPLE 7
(SOLIDIFICATION TEST OF A STYRENE-BUTADIENE SYNTHETIC RUBBER LATEX WITH A POLYQUATERNARY POLYMER, WITHOUT PH ADJUSTMENT)

200 mL of a solution constituted by 0.5 g of dimethylamine-epichlorohydrin copolymer (commercially available under the commercial name Prodefloc® or Floquat® FL 2250) in 200 ml of water are added into a container of 500 mL containing 100 g of styrene-butadiene synthetic rubber with 30% of solid and having a pH of about 10 (prepared as described, for example, in U.S. Pat. No. 2,680,111).

The obtained mixture was maintained at the temperature of 25° C. for about 1 minute, by mixing with a magnetic stirrer set at 200 rpm.

In this conditions, the latex coagulation is not observed.

As described in U.S. Pat. No. 4,001,486, it is important to note that the preventive pH adjustment to values included in the range of 1.5-7.0 is necessary to obtain the coagulation of the synthetic rubber latex.

Finally, it is to be intended that further modifications and variations can be made to the described and illustrated process, without coming out from the scope of protection of the appended claims.

The invention claimed is:

1. A process for solidification of a natural rubber latex comprising:
    a) contacting the natural rubber latex, said natural rubber latex having a pH between 7.2 and 13 with a polyquaternary polymer, obtaining a suspension of solid natural rubber particles in a liquid phase comprising a latex serum; and
    b) separating the solid natural rubber particles from the liquid phase of the suspension,
    wherein the process does not require a pH adjustment of the natural rubber latex before it is in contact with said polyquarternary polymer.

2. The process according to claim 1, wherein the process carried out batchwise.

3. The process according to claim 1, wherein the contacting a) comprises a first phase in which substantially all the natural rubber latex to be processed is fed to a mixing area and a second phase in which the polyquaternary polymer is fed to said mixing area.

4. The process according to claim 3, wherein said polyquaternary polymer is fed to said mixing area under stirring in a time ranging from 0.5 to 60 minutes.

5. The process according to claim 1, wherein the suspension of solid natural rubber particles obtained in the contacting a) is maintained under stirring for a time ranging from 0.5 to 120 minutes before passing to the separating b).

6. The process according to claim 1, wherein the process is carried out continuously.

7. The process according to claim 1, wherein the contacting a) is carried out by co-feeding both the natural rubber latex and the polyquaternary polymer to a mixing area.

8. The process according to claim 1, wherein the natural rubber latex is obtained from guayule type plants.

9. The process according to claim 1, wherein the natural rubber latex comprises at least one stabilizer and/or at least one preservative.

10. The process according to claim 1, wherein the polyquaternary polymer is the copolymer dimethylamine-epichlorohydrin.

11. The process according to claim 1, wherein said polyquaternary polymer is fed to the first mixing area in the contacting a) in the form of an aqueous solution.

12. The process according to claim 1, wherein the total quantity of said polyquaternary polymer used in the contacting a) is ranging from 0.25 phr to 5 phr.

13. The process according to claim 1, wherein the contacting a) is carried out at a temperature ranging from 0.5'C to 50'C.

14. The process according to claim 1, wherein the separation of the solid natural rubber particles from the liquid phase of the suspension of the separating b) is carried out b filtration of said suspension.

15. The process according to claim 1, wherein the separation of the solid natural rubber particles from the liquid phase of the suspension of the separating b) is effected by decanting or siphoning.

16. The process according to claim 1, which comprises an optional washing of the solid natural rubber particles with water.

* * * * *